United States Patent [19]

Dodson

[11] Patent Number: 5,308,544
[45] Date of Patent: May 3, 1994

[54] LIQUID SCINTILLATION SOLUTION USEFUL FOR ALPHA PARTICLE EMISSION AND BETA PARTICLE EMISSION DISCRIMINATION

[75] Inventor: Charles L. Dodson, Orange, Calif.

[73] Assignee: Beckman Instruments, Inc., Fullerton, Calif.

[21] Appl. No.: 843,707

[22] Filed: Feb. 28, 1992

[51] Int. Cl.$^5$ ............................................. C09K 11/06
[52] U.S. Cl. ........................... 252/301.17; 252/301.16
[58] Field of Search ..................................... 252/301.17

[56] References Cited

U.S. PATENT DOCUMENTS

| | | | |
|---|---|---|---|
| 4,075,480 | 2/1978 | Horrocks | 250/328 |
| 4,578,213 | 3/1986 | Simonetti | 252/301.17 |
| 4,657,696 | 4/1987 | Thomson | 252/301.17 |
| 4,867,905 | 9/1989 | Wunderly | 252/301 |
| 4,916,711 | 4/1990 | Boyer et al. | 252/301.17 |
| 5,135,679 | 8/1992 | Mirsky | 252/301.17 |

OTHER PUBLICATIONS

Beckman Instruments, Inc. Bulletin No. 7894; "Introduction to Alpha/Beta Discrimination on Liquid Scintillation Counters"; Copyright 1991, Charles Dodson.
W. J. McDowell. National Academy of Sciences-National Research Council Bulletin NAS-NS-3116 "Alpha Counting and Spectrometry Using Liquid Scintillation Methods" (1986).
McKlveen, J. W. & McDowell, W. J.; "Liquid Scintillation Alpha Spectrometry Techniques"; *Nuc. Inst. Meth.* 223: 372–376 (1984).
Beckman Instruments, Inc. Technical Report 1095 NUC-77-IT. "The II Number Concept" Horrocks, D. L. (1977).
Beckman Instruments, Inc. Product Bulletin No. 7880, "LS 6000 Series Scintillation Systems." (1991).
Beckman Instruments, Inc. Product Bulletin No. 7885. "LS 6000 Scintillation Systems". (1991).

*Primary Examiner*—Ellen M. McAvoy
*Attorney, Agent, or Firm*—William H. May; P. R. Harder; Janis C. Henry

[57] ABSTRACT

Disclosed herein is a liquid scintillation solution useful for alpha particle emission and beta particle emission discrimination. Most preferably, the liquid scintillation solution comprises at least one naphthalene derivative enhancing agent; at least one solvent; and at least one fluor. In a particularly preferred embodiment, the liquid scintillation solution comprises di-isopropyl naphthalene as the enhancing agent; phenylxylethane as the solvent; and 2-(4'-biphenyl)-6-phenylbenzoxazote as the fluor.

18 Claims, 4 Drawing Sheets

LIQUID SCINTILLATION SOLUTION USEFUL FOR ALPHA PARTICLE EMISSION AND BETA PARTICLE EMISSION DISCRIMINATION

FIELD OF THE INVENTION

The present invention is directed to analytical methodologies in general, more particularly to spectrometry analysis of samples containing radioactive constituents, and specifically to a liquid scintillation solution useful in discrimination of alpha radiation emitters and beta radiation emitters.

BACKGROUND OF THE INVENTION

Liquid scintillation counting is an analytical technique by which the energy of radioactive emissions from isotopes used for labeling a select material, or intrinsically present in a sample, is converted into light so that the isotopes can be detected and measured. By detecting and measuring light caused by the radioactive emissions, the emissions can be analyzed to determine quantitative information about the isotopes in the sample.

Liquid scintillation depends on the critical interactions between the radioactive sample and the surrounding liquid solution medium. This solution is often referred to as a "cocktail." The emission of radioactive energy from the radioactive sample is accompanied by an excitation, or "ionization" of the molecules in the cocktail. Certain molecules in the cocktail emit (typically) visible light, i.e., they "fluoresce", when they interact with ionizing radiation. The liquid scintillation process by which radioactive emissions are investigated is, then, an analysis or investigation of an energy transfer process in which at least two organic compounds in a scintillation solution participate. It is the function of the liquid scintillation solution to convert the energy of the emitted radioactive particles into light which can be detected and measured.

A "liquid scintillation counter" is an instrument used to detect the emitted light flashes, or "light scintillation", of the fluorescence. The rate of production of light scintillations is proportional to the rate of radioactive decay. Additionally, the intensity of the light scintillations (measured as "photons") is proportional to the energy of the decaying radioactive particles. Exemplary of such instruments is the LS 6000 ™ Series Scintillation Systems, available from Beckman Instruments, Inc. (Fullerton, Calif. 92634, U.S.A.).

The chemical nature of the liquid scintillation solution facilitates energy transfer from the radioactive emissions to constituents in the liquid scintillation solution causing scintillation. The liquid scintillation solution comprises a chemical known as a "fluor," also referred to as a "primary scintillator," which is dissolved in another organic chemical known as a "solvent." The fluor is the chemical constituent of the liquid scintillation solution which emits light by fluorescence when sufficient energy is received via the solvent from a radioactive particle emitted by the isotope. Common beta-emitting isotopes include tritium ($^3$H), carbon-14 ($^{14}$C) and chlorine-36 ($^{36}$Cl). A common alpha emitting isotope includes Americium-241 ($^{241}$Am). The solvent (alone) does not scintillate; rather, it functions as a "link" in the energy transfer "chain" by passing on its acquired energy to the fluor which in turn permits light scintillation to occur.

A beta particle traveling through the liquid scintillation solution following emission from a radionuclide causes excitation of the solvent molecules surrounding the labeled sample molecule in the scintillation medium. As an emitted beta particle travels through the scintillation medium, molecules of the solvent become converted to excited molecules as the radioactive particle loses its energy to these molecules. The amount of energy which the emitted beta particle possesses determines how far the particle will travel before it comes to rest. Because the beta particle loses energy by interaction or contact with the solvent molecules in its path (when the solvent molecules become excited to higher energy states), the number of solvent molecules that the emitted beta particle will excite is directly proportional to the distance the particle travels through the liquid scintillation solution. This in turn is proportional to the energy the particle possesses.

A typical molecule of a solvent which can be excited by coming in contact with a radioactive particle is aromatic in chemical character. An "aromatic" chemical compound has at least one benzene ring. The aromatic character of the molecule permits electrons to become excited to a higher energy state so that the solvent molecule can retain the excitation energy for a period of time. Detailed information regarding the characteristics of solvents applicable in liquid scintillation cocktails are set forth in, inter alia, U.S. Pat. No. 4,867,905, which is incorporated herein by reference.

Once the solvent molecule is excited by absorbing energy from the emitted radioactive particle, it can lose this energy in one of two modes, emission of heat or light. Before the solvent molecule can decay, thus relieving its absorbed energy, it is desirable that a fluor molecule in the scintillation solution interact with the solvent molecule. The presence of a fluor allows for the eventual transfer of excitation energy of the solvent molecule to the fluor molecule. The fluor molecule then releases its excitation energy as light. Detection and measurement of energy received by the fluor is accomplished by detecting and measuring the light generated.

A widely known fluor utilized in liquid scintillation systems is 2,5-diphenyloxazole ("PPO"). Other applicable fluors include 2-(4'-biphenylyl)-6-phenylbenzoxazole ("PBBO"); 2 (4 tert.-butylphenyl) 5-(4"-biphenylyl)-1,3,4-oxadiazole ("Butyl-PBD");2-(1-naphthyl)-5-phenyloxazole ("αNPO"); 2-(4-biphenylyl)-5-phenyl-1,3,4-oxadiazole ("PBD"); 9,10-diphenylanthracene ("DPA"); 2,5-bis (5'-tert.-butyl-2-benzoxazole) thiophene ("BBOT"); P-bis (o-methylstyryl) benzene ("BisMSB"); and 2,2'-p-phenylenebis [5-phenyloxazole] ("POPOP").

A fluor is generally present in the liquid scintillation solution in very low concentrations, on the order of five to ten grams per liter. Thus, solvent molecules which have been excited by absorption of energy from a beta particle often transfer their energy to another solvent molecule which in turn becomes excited as the transferring solvent molecule is de-energized. This energy transfer chain, or "cascade", can continue until an excited solvent molecule transfers this energy to a fluor molecule, which then will decay by scintillating.

Light released by a fluor is generally in a narrow frequency or wavelength band. The number of photons of light energy released is directly proportional to the number of solvent molecules from which the fluor molecules receive energy over a certain period of time. The energy transferred to an excited solvent molecule ultimately energizes a fluor molecule, which then releases light by scintillation. This permits the energy of the radioactive particle to be measured as intensity of light because high energy particles will have long path lengths and excite many solvent molecules, which then excite fluor molecules. Because the scintillation process takes place in a matter of nanoseconds, the number of fluor molecules fluorescing within such a small segment of time will be detected as greater or less intensity of light by, e.g., a photomultiplier tube(s) in a liquid scintillation instrument. Thus, high energy radioactive particles emitted from the isotope will have long pathlengths and excite many solvent molecules which in turn cause fluor molecules to fluoresce many times releasing bright light; low energy particles, on the other hand, will have shorter pathlengths and excite fewer solvent molecules which in turn cause fewer fluor molecules to fluoresce and release dimmer light.

In some instances a secondary fluor, also referred to as a "secondary scintillator", will be used to shift the wavelength region of light scintillation caused in the liquid scintillation solution to one which is more desirable. Secondary fluors are also organic compounds which are added to the liquid scintillation solution in small quantities relative to the quantity of the primary fluor. The light scintillation of a secondary fluor is caused by energy received from the primary fluor. The result of having a secondary light scintillation is to shift emitted light to longer wavelengths. An exemplary secondary scintillator is 1,4-di-(2-methylstyryl)-benzene ("Bis-MSB").

Recent increased attention and focus on, inter alia, the environmental impact of radioactive materials from naturally occurring radioactive sources (e.g., radon gas) and from human-made radioactive materials and by-products (e.g. from nuclear-reactor based energy systems) has lead to a greater need to obtain accurate, quantitative information regarding both alpha- and beta-emitting particles. Briefly, an "alpha" radioactive decay refers to the emission of a helium ion ("$He^{+2}$") from an unstable nucleus to produce a different nuclide with four less atomic mass units and two less protons in the nucleus. (A "nuclide" refers to a particular nuclear species of an element characterized by the number of protons and neutrons). For example, schematically an alpha radioactive decay can be set forth as follows vis-a-vis Americium ("Am") and Neptunium ("Np"):

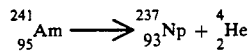

Characteristically, alpha particles have discrete, well-defined energy spectrum. Beta particles, on the other hand, have very broad energy spectrum, due to energy sharing between the released beta particle and an anti-neutrino $\bar{v}$. Normally, the energy spectrum begins at zero kilo-electron Volts ("keV") where all of the energy is given to the anti-neutrino, and ends at some energy maximum keV based upon the particular radionuclide. With beta-decay, the mass number of the nuclide remains the same, while the number of protons increase. Schematically, a beta radioactive decay can be set forth as follows vis-a-vis Chlorine ("Cl"), and Argon ("Ar"):

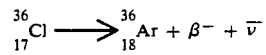

For convenience, a liquid scintillation counter spectrum for $^{241}Am$ and $^{36}Cl$ are set forth in FIG. 1 in terms of counts per minutes versus keV.

Alpha particles do not (generally) penetrate the epidermal layer of tissue (e.g., the outer layer of animal skin tissue). Alpha particles ionize other molecules more efficiently than beta-particles, and thus are more insidious than beta emitting particles. Once alpha particles enter an animal by, e.g., airborne intake via the lungs, they can directly damage the lung tissue. Unlike alpha particles, beta emitting particles can penetrate tissue; as such, they can damage tissue directly.

Accordingly, it is essential to be able to accurately define and quantify the alpha- and beta-emitting particles of a particular radioactive material. Radon gas, for example, which has received widespread attention over the past decade, will spontaneously decompose in about four hours to produce three alpha-particles and two beta-particles. In certain geographical regions of the United States of America, for example, it is essential that dwelling facilities be regularly checked for radon gas, given the potential for this naturally occurring material to potentially cause radiation-related damage.

Previous methodologies for discriminating between alpha- and beta-emitters have been proposed. For example, the energy range for most beta emitters is 0–2 million eV ("MeV"), while for alpha-emitters, the range is from 3–8 MeV. These differences can (somewhat) be used for discrimination purposes, although a range of overlap between the high end of the beta-emitters and the low end of the alpha-emitters is possible. Alpha- and beta-emitters mixed in the same sample can be discriminated from each other by the time distribution of the light emission each generates from the liquid scintillation cocktail, typically referred to as "pulse shaped discrimination" or "PSD".

PSD is predicated upon both a fast and a slow decay component of a light pulse generated over a period of time; the fast component has an exponential decay time on the order of about 1–10 nanoseconds ("ns"), while for the slow component, 200–350ns, each being dependent upon the specifics of the particular liquid scintillation solution. The fast component is the result of normal fluorescence while the slow component results from delayed fluorescence. The wavelength of both components is the same. There is a difference in the relative distribution of the fast and slow components for alpha and beta particles; with alpha emitters, the slow component predominates, while with beta emitters, the fast component predominates. This difference can be exploited for alpha-beta discrimination via PSD and the so-called "R-value technique." The R-value is derived by integrating the area under portions of a light-intensity versus time plot of light pulses measured at two different times. I.e., $t_0 \rightarrow t_1 = I_1$ and $t_0 \rightarrow t_2 = I_2$. A ratio value, R, is then derived according to the formula $R = I_2/I_1$, where R is the ratio of the two integrated areas. By determining several R values for both the alpha- and beta-emitters in the sample, an "R-value spectrum" can be developed for the emitters. FIG. 2 provides an R value spectrum for $^{241}Am$ and $^{36}Cl$ using a previous liquid scintillation cocktail comprising PBBO, naphthalene and toluene used for alpha-beta discrimination.

Using such cocktails, the R value spectrum, when used for alpha-beta discrimination, evidences a "contamination" region where an overlap occurs. Such a region is set forth in FIG. 2 at approximately an R value minimum of 1.4; this is a region where discrimination between alpha- and beta-emitting particles is not possible. For this particular analysis, this region represents a 5% beta-emission contamination. Typically, a 4 to 8% contamination range is considered acceptable using such previous cocktails. Clearly, however, this is a mere accommodation to the shortcomings of such cocktails in that ideally, the percent of contamination should approach zero.

Additionally, the utility of such cocktails is also evaluated based upon the "peak-to-valley ratio", or PV ratio, obtained from the R value spectrum. The PV ratio is defined by the unit value of the highest peak from the R value spectrum (i.e., typically the beta R value peak) divided by the lowest portion between the two peaks (i.e., in FIG. 2, the contamination region). For FIG. 2, the PV ratio is 4.4.

Preferably, an alpha-beta discrimination cocktail should completely discriminate between the two emitters; this, of course, would mean that there would be substantially little, if any, contamination region such that the peak-valley ratio would be quite high, i.e., much greater than the 4.4 value obtained from FIG. 2. Such a cocktail would allow for an accurate indication of the precise differentiation between the alpha-emitting components and the beta-emitting components derived from a single sample.

SUMMARY OF THE INVENTION

Disclosed herein is a liquid scintillation solution particularly suited for alpha-beta particle emission discrimination comprising:
a) at least one naphthalene derivative, said derivative comprising naphthalene and at least two alkyl groups, where the alkyl groups are co-planar with said naphthalene; and
b) at least one fluor compound.

Preferably, each alkyl group of the naphthalene derivative is individually selected from the group consisting of: (a) branched alkyls having from about 2 to about 3 carbon atoms where the carbon atoms of the branch are connected by single bonds; (b) branched alkyls having from about 2 to about 6 carbon atoms where the carbon atoms of the branch are connected by double bonds; (c) straight chain alkyls having from about 1 to about 3 carbon atoms attached to each other by single bonds; and (d) straight chain alkyls having from about 1 to about 6 carbon atoms are attached to each other by double bonds. A criteria of critical import in selecting the naphthalene derivative is that the alkyl groups are attached to the naphthalene moiety such that the groups are co-planar with the naphthalene moiety. Most preferred naphthalene derivatives are the di-isopropyl naphthalenes ("DIN").

Preferably, the naphthalene derivative functions in conjunction with a solvent as an "enhancing agent", i.e., the naphthalene derivative enhances the decay time caused by interactions between the radionuclide and the solvent molecules.

The solvent can be an aromatic compound selected from the group consisting of 1,2,4,-trimethyl benzene, p-xylene, toluene, benzene, dioxane and cyclobexane. More preferably, the solvent is a biodegradable material selected from the group consisting of DIN and 1-phenyl -1-(o-xylylethane) ("PXE"). Most preferably, the solvent is PXE.

The fluor is preferably selected from the group consisting of 2-(4'-biphenylyl)-6-phenylbenzoxazole ("PBBO"); 2-(4-tert.-butylphenyl)-5-(4"-biphenylyl)-1,3,4-oxadiazole ("Butyl-PBD"); 2-(1-naphthyl)-5-phenyloxazole ("αNPO"); 2-(4-biphenylyl)-5-phenyl-1,3,4-oxadiazole ("PBD"); 9,10-diphenylanthracene ("DPA"); 2,5-diphenyloxazole ("PPO"); 2,5-bis (5'-tert.-butyl-2-benzoxazole) thiophene ("BBOT"); p-bis (o-methylstyryl) benzene ("BisMSB"); and 2,2'-p-phenylenebis [5-phenyloxazole] ("POPOP"). Most preferably the fluor is PBBO.

With respect to aqueous samples, the liquid scintillation solution preferably further comprises an emulsifying agent. Such emulsifiers are well known in the art; exemplary emulsifying agents include ethoxylated nonylphenol and sodium dihexyl sulfosuccinate.

In accordance with the foregoing, a particularly preferred embodiment of the disclosed liquid scintillation solution comprises the naphthalene derivatives DIN; the solvent PXE; and the fluor PBBO. For aqueous samples, the liquid scintillation solution preferably further comprises the emulsifying agents ethoxylated nonylphenol and sodium dihexyl sulfosuccinate.

DETAILED DESCRIPTION OF PREFERRED EMBODIMENTS

Figure 1:
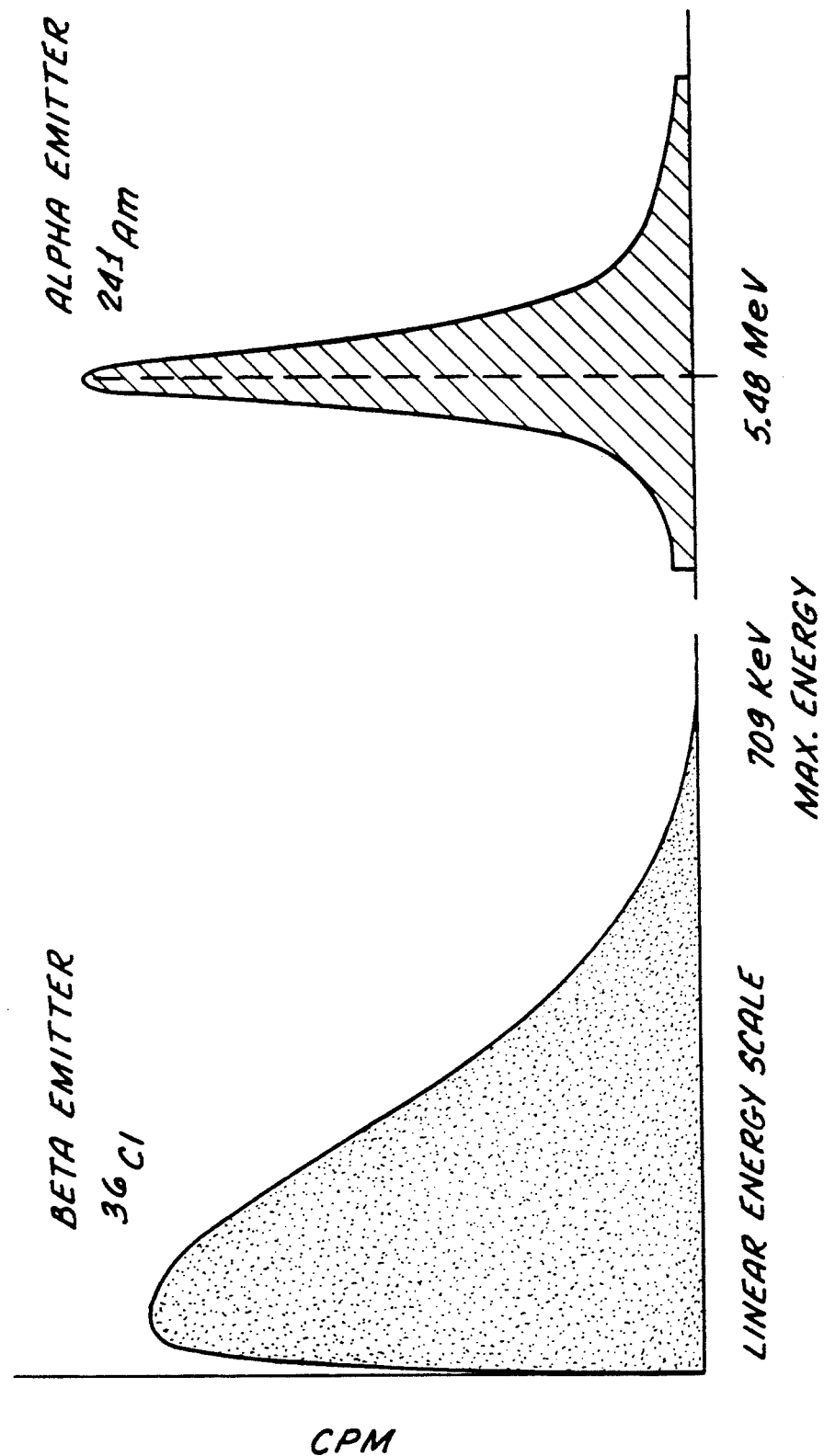
FIG. 1 is a comparative graph of the spectrum of an alpha emitter, Americium-241, and a beta-emitter, Chlorine 36.

Beneficially, Americium 241 is primarily an alpha-emitter, while Chlorine.36 is primarily a beta-emitter. Accordingly, these materials are ideally suited for investigation of alpha-beta emission discrimination. Additionally, these materials, when mixed together and subjected to liquid scintillation techniques, evidence overlapping spectra. Previously, and even with accepted alpha-beta discrimination techniques, there is overlap of the spectra. For example, FIG. 3 provides a typical Americium-241 and Chlorine-36 mixed sample spectra without alpha-beta emission discrimination or PSD. As those in the art recognize, the relatively low planar portion of FIG. 3 is attributed to Chlorine-36, while the peak is attributed to Americium.241; however, as is further appreciated by the skilled artisan, there is a portion of Chlorine 36 beta emissions that overlaps specifically with the Americium-241 peak, i.e. an area of "contamination" where discrimination between alpha and beta emissions is necessary. Heretofore, even with PSD techniques, previous liquid scintillation cocktails could not fully discriminate between alpha and beta emissions, as evidenced by the R value spectrum set forth in FIG. 2.

Using the presently disclosed liquid scintillation solution, excellent discrimination between alpha- and beta-emissions is possible. In accordance with the present invention, a liquid scintillation solution in which a radioactive sample is mixed to obtain a scintillation phenomenon by which the sample is analyzed comprises:
a) at least one naphthalene derivative, said derivative comprising naphthalene and at least two alkyl groups, where the alkyl groups are each co-planar with said naphthalene; and
b) at least one fluor compound.

Applicant has discovered that the use of at least one naphthalene derivative in conjunction with at least one fluor both substantially decreases the alpha-beta contamination range and substantially increases the alpha-beta peak-to-valley ratio for R value spectra. While the use of such naphthalene derivatives in conjunction with a fluor provides meaningful and useful discrimination results, advantageous use of such derivatives in conjunction with a solvent provides even greater alpha-beta discrimination. Thus, in conjunction with at least one solvent, the naphthalene derivatives function as "enhancing agents".

Although not wishing to be bound to any particular theory, Applicant postulates that such enhancing agents enhance the decay time of the fluorescence caused by radioactive emissions interacting with the solvent and fluor. For example, focusing on a particularly preferred naphthalene derivative, DIN, the first unoccupied antibonding molecular orbital of DIN is closer to its ground state than, e.g., the corresponding molecular orbital of naphthalene is to its ground state. Accordingly, less energy is required to cause excitation of DIN relative to naphthalene. Because of this, the probability for the presence of triplet states increases. Based upon this postulated theory, Applicant further theorizes that the naphthalene derivative enhancing agents must be coplanar, i.e. the alkyl constituents must be within the same planar surface as the naphthalene moiety. Such co-planarity allows for the formation of chemical dimers between two such naphthalene derivatives such that an additional means to produce electronic triplets is possible. The naphthalene derivative, then, can be utilized alone or utilized in conjunction with a solvent(s) as an enhancing agent. Preferably, the naphthalene derivative is utilized as an enhancing agent.

Preferably, each alkyl group of the naphthalene derivative is individually selected from the group consisting of: (a) branched alkyls having from about 2 to about 3 carbon atoms where the carbon atoms of the branch are connected by single bonds; (b) branched alkyls having from about 2 to about 6 carbon atoms where the carbon atoms of the branch are connected by double bonds; (c) straight chain alkyls having from about 1 to about 3 carbon atoms attached to each other by single bonds; and (d) straight chain alkyls having from about 1 to about 6 carbon atoms are attached to each other by double bonds. A criteria of critical import in selecting the naphthalene derivative is that the alkyl groups are attached to the naphthalene moiety such that the groups are co-planar with the naphthalene moiety. Particularly preferred naphthalene derivatives are the di-isopropyl naphthalenes. These can be present singularly or in combination and include 1,3-bis(1-methylethyl) naphthalene; 1,4-bis (1-methylethyl) naphthalene; 1,6-bis(1-methylethyl) naphthalene; 1-7-bis(1-methylethyl) naphthalene; 2,6-bis (1-methylethyl) naphthalene; and 2,7-bid (1-methylethyl) naphthalene. In a particularly preferred embodiment, a combination of each of the foregoing di-isopropyl naphthalenes is utilized in the following percentages: 7–10%; 2–8%; 4–12%; 4–12%; 4–15%; and 4–12%, respectively, in the liquid scintillation cocktail.

As noted, it is preferred that the naphthalene derivative function in conjunction with a solvent as an enhancing agent. Thus, it is preferred that the liquid scintillation solution further comprise at least one solvent. The solvent can be any solvent applicable to liquid scintillation solutions. See: for example, U.S. Pat. No. 4,867,905, previously referenced. Applicable solvents include aromatic compounds selected from the group consisting of 1,2,4-trimethyl benzene, p-xylene, toluene, benzene, dioxane and cyclohexane. Preferably, the solvent is a biodegradable material selected from the group consisting of DIN and 1-phenyl-1-(o-xylylethane) ("PXE"). In a particularly preferred embodiment of the invention, the solvent is PXE. Most preferably, the percentage of PXE present in the liquid scintillation solution is between about 40–48%.

The fluor can be any fluor or fluors applicable to liquid scintillation solutions. Exemplary fluors include 2-(4'-biphenylyl) 6-phenylbenzoxazole ("PBBO"); 2-(4-tert.-butylphenyl)-5-(4"-biphenylyl)-1,3,4-oxadiazole ("Butyl-PBD"); 2-(1-naphthyl)-5-phenyloxazole ("αNPO"); 2-(4-biphenylyl)-5-phenyl-1,3,4-oxadiazole ("PBD"); 9,10-diphenylanthracene ("DPA"); 2,5-diphenyloxazole ("PPO"); 2,5-bis (5'-tert.-butyl-2-benzoxazole) thiophene ("BBOT"); p-bis (o-methylstyryl) benzene ("BisMSB"); and 2,2'-p-phenylenebis [5-phenyloxazole] ("POPOP"). Most preferably the fluor is PBBO. Most preferably, the percentage of PBBO present in the liquid scintillation solution is less than about 1.0%.

As those in the art appreciate, it is often necessary to analyze aqueous solutions for radioactivity. For example, ground-stream water analyzed from the vicinity of a nuclear power plant. When aqueous samples are analyzed, the liquid scintillation solution further comprises an emulsifying agent, i.e. any agent applicable to liquid scintillation solutions and capable of dispersing the aqueous sample throughout the liquid scintillation solution. Exemplary emulsifying agents include ethoxylated nonylphenol and sodium dihexyl sulfosuccinate. Such agents are well-known in the art and will not be discussed herein in detail. Beneficially, the emulsifying agent can be included in the liquid scintillation solution for the analysis of non-aqueous samples; however, this is not a requirement. Preferably, both ethoxylated nonylphenol and sodium dihexyl sulfosuccinate are utilized as the emulsifying agent. In a particularly preferred embodiment, the percentage of each of these materials present in the liquid scintillation solution is between 2–5% and 1–4%, respectively.

As those in the art appreciate, the H Number is a value ascribed to the degree of quench present in samples of radioactive-emitting samples that are being measured by a liquid scintillation method. A methodology for deriving H Numbers is set forth in U.S. Pat. No. 4,075,480, which is incorporated fully herein by reference. Reference is also made to Beckman Instruments, Inc. Technical Report 1095-NUC-77-IT, "The H Number Concept," which is also incorporated herein by reference. Preferably, the H Number of the liquid scintillation solution is less than about 175, preferably less than 100 and most preferably less than about 25.

In accordance with the foregoing, a particular preferred embodiment of the liquid scintillation solution comprises the following:

| Ingredient | Percentage |
|---|---|
| 1-phenyl-1-(o-xylylethane) (PXE) | 40–48 |
| 2-(4'-biphenylyl)-6-phenylbenzoxazole (PBBO) | <1 |
| di-isopropyl naphthalenes | |
| 1,3-bis(1-methylethyl) naphthalene | 7–10 |
| 1,4-bis(1-methylethyl) naphthalene | 2–8 |
| 1,6-bis(1-methylethyl) naphthalene | 4–12 |
| 1,7-bis(1-methylethyl) naphthalene | 4–15 |
| 2,6-bis(1-methylethyl) naphthalene | 4–12 |

With respect to aqueous samples, a particularly preferred embodiment of the liquid scintillation solution further comprises ethoxylated nonylphenol (2–5%) and sodium dihexyl sulfosuccinate (1–4%).

EXAMPLES

The following examples directed to preferred embodiments are not intended, nor are they to be construed to be, limitations on the disclosure or the claims to follow:

I. MATERIAL AND METHODS

A. Scintillation System

A Beckman Instruments, Inc. LS 6000 TM Scintillation System was utilized for analysis of samples. The aforementioned system is applicable to analysis of, inter alia, samples comprising alpha-emitters and beta-emitters. Additionally, the aforementioned system can derive an H Number during analysis, and thus correct for quench. Inter alia, analytical results can be presented as R value spectra with the aforementioned system. Manufacturer instructions were followed with respect to sample analysis; analytical conditions for the instrument were identical for the comparative runs.

B. Liquid Scintillation Solutions

Two liquid scintillation solutions were prepared. The first ("Comparative Cocktail") was a solution which has heretofore been utilized for alpha-beta discrimination purposes. The second was prepared in accordance with a particularly preferred embodiment of the present invention. Both cocktails were spiked with appropriate amounts of Americium-241 (Isotope Products, Cat. No. 6241) and Chlorine-36 (New England Nuclear Labs, Cat No. NE 2-019) to achieve between 35–40,000 cpms for each radionuclide (i.e. 70–80,000 cpms total). All chemicals used in the preparation of the cocktails were at least of ACS grade.

1. Comparative Cocktail 4 gm of 2-(4'-biphenylyl)-6-phenylbenzoxazole ("PBBO") and 180 gm of naphthalene were admixed with sufficient toluene to make 1.0 liter of solution. For analysis thereof, 10 ml samples were spiked with the radionuclides as described above.

2 Alpha-Beta Discrimination Cocktail 35 gm of PBBO, 25.8 gm of ethoxylated nonylphenol, and 17.1 gm of sodium dihexyl sulfosuccinate were admixed with 500 ml of 1-phenyl-1 (o-xylyl) ethane ("PXE") and 500 ml of di-isopropyl naphthalene ("DIN"). For analysis thereof, 10ml samples were spiked with the radionuclides as described above.

II. ANALYTICAL RESULTS

Figure 2:
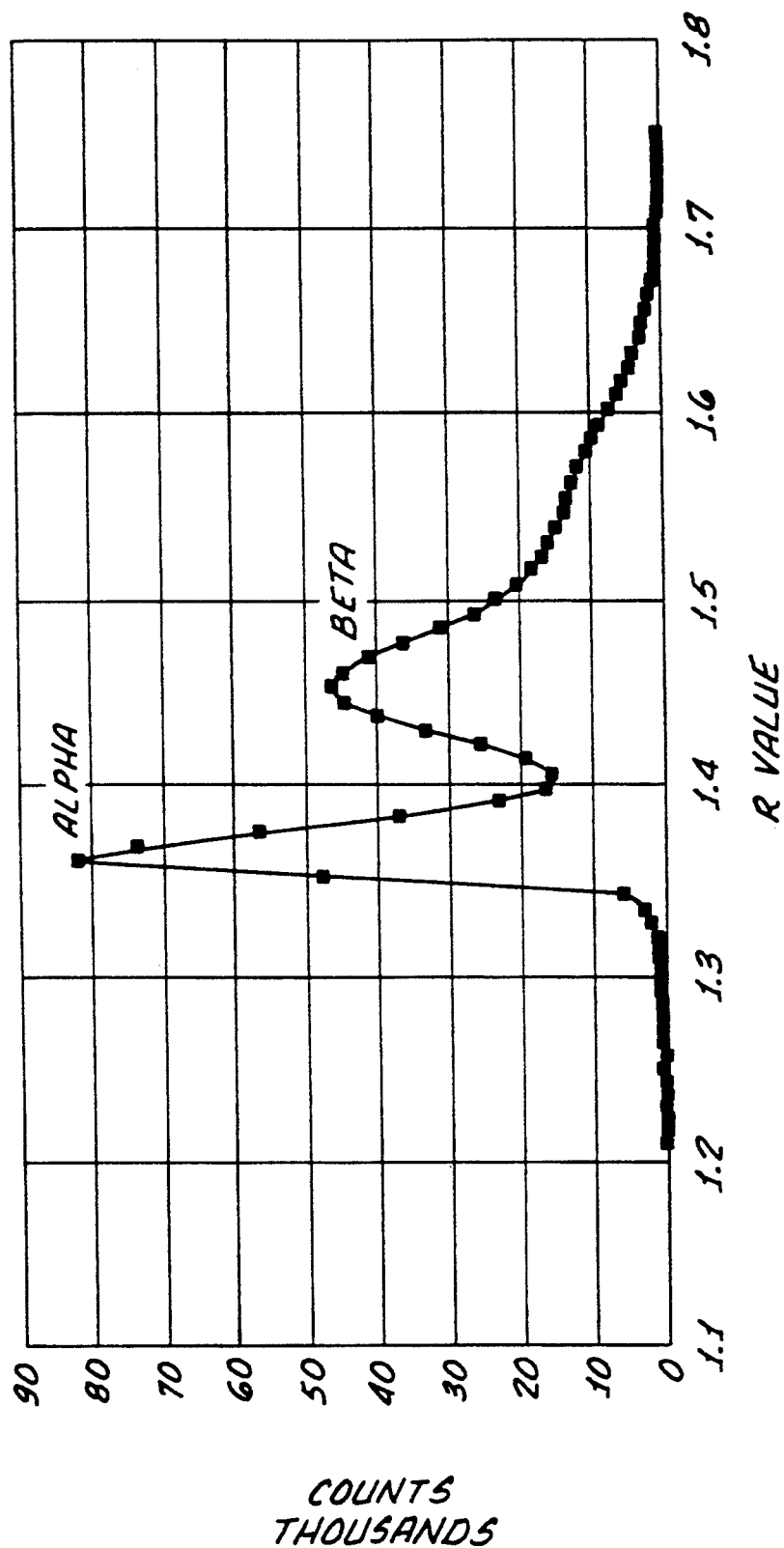
FIG. 2 is an R spectrum for Americium-241 and Chlorine 36 as determined using a previous liquid scintillation cocktail.
Figure 3:
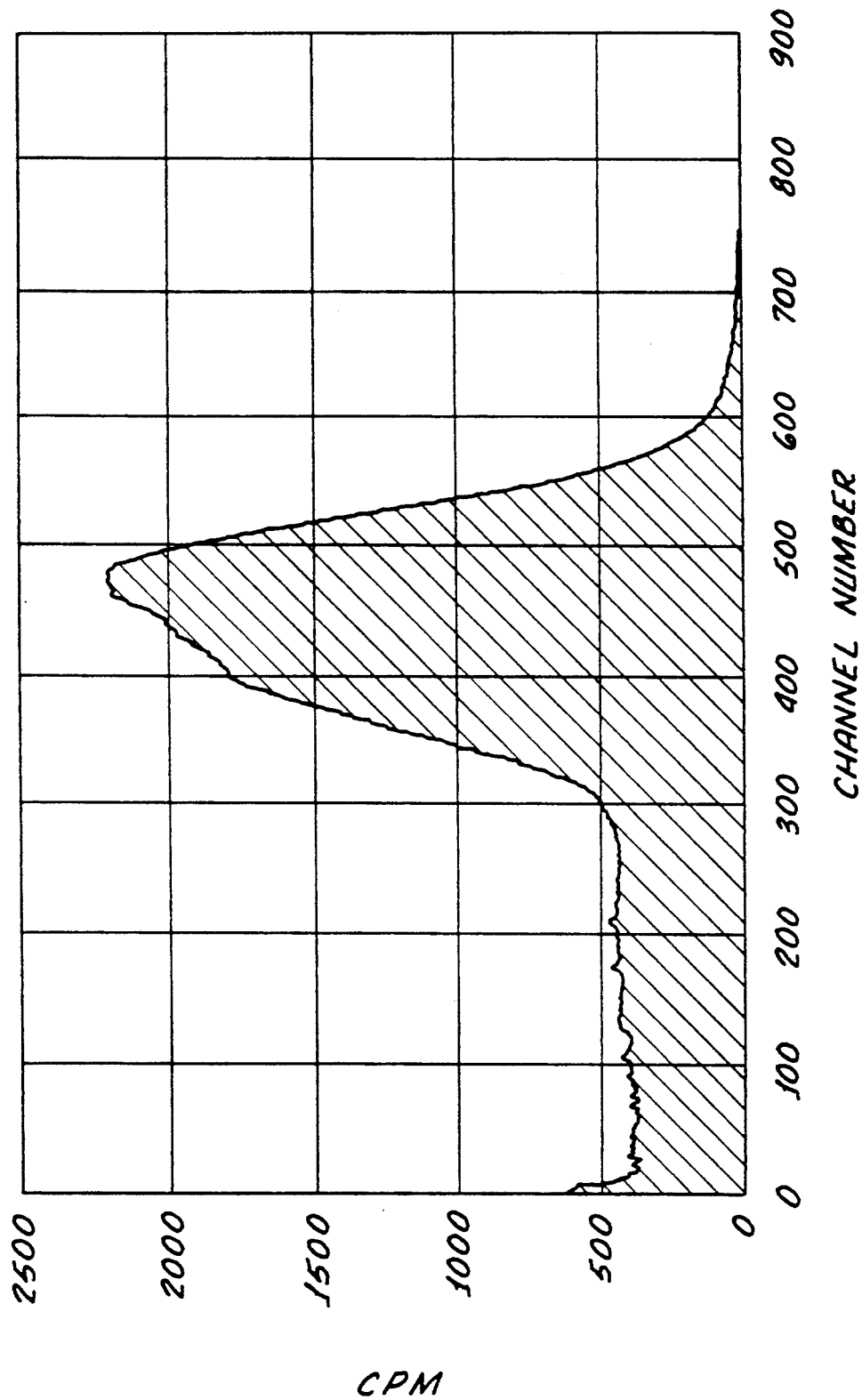
FIG. 3 is a pulse height spectrum of Americium-241 and Chlorine 36 without pulse shaped discrimination.

An R value spectra for Americium-241 and Chlorine-36 added to the Comparative Cocktail is set forth in FIG. 2. As noted above, heretofore such results have been accepted, despite an approximate 5% beta contamination for the results, the PV ratio was 4.4 at a minimum R of about 1.4.

Figure 4:
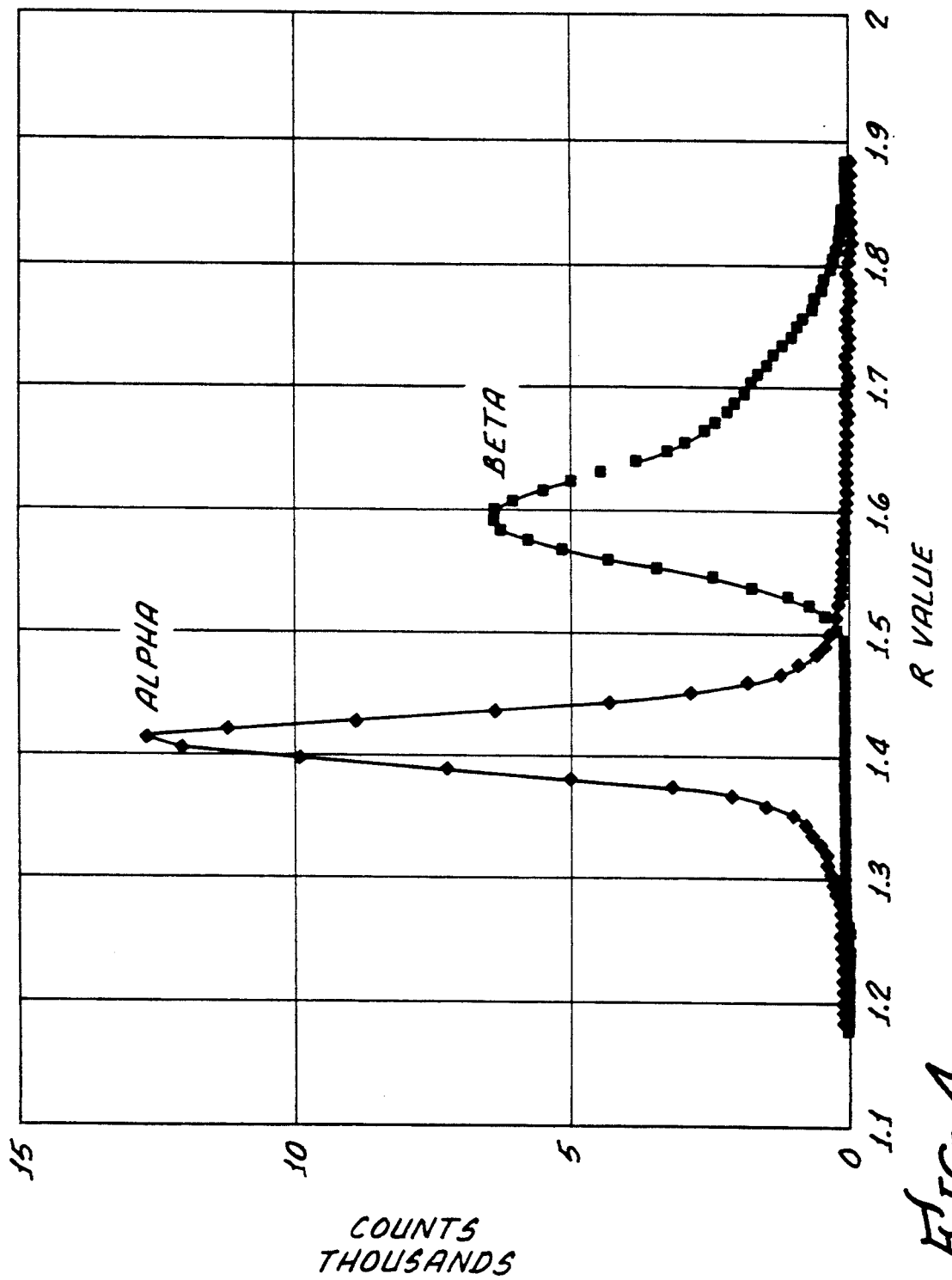
FIG. 4 is an R spectrum for Americium.241 and Chlorine.36 as determined using a particularly preferred embodiment of the disclosed liquid scintillation cocktail.

With respect to the Alpha-Beta Discrimination Cocktail, an R value spectra for Americium-241 and Chlorine-36 added thereto is set forth in FIG. 4. In FIG. 4, the beta contamination is less about 1.0%, i.e. greater than 99% of the alpha "calls" were correct. It is further noted that the PV ratio of FIG. 4 is 71 at a minimum R of about 1.5.

These results evidence the superior nature of the disclosed liquid scintillation solution for alpha-beta discrimination as compared to previously utilized cocktails. Because of the increased discrimination capabilities associated with the disclosed cocktail, superior qualitative and quantitative results can be achieved. This allows for more definitive analysis of samples comprising alpha- and beta-emitters.

While the foregoing has been described in considerable detail with regard to certain preferred embodiments thereof, other embodiments within the scope of the teachings of the present invention are possible. For example, the disclosed liquid scintillation solution can also be utilized in sample analyses other than for alpha-beta discrimination purposes. Additionally, liquid scintillation instruments other than the particular instrument referenced above can be utilized. Accordingly, neither the disclosure, nor the claims to follow, are intended, nor should be construed to be, limited by the descriptions of the preferred embodiments contained herein.

I claim:

1. A method for discriminating between alpha emissions and beta emissions in a sample, said method comprising the steps:
   a) providing an alpha-beta discrimination sample solution comprising:
      i) at least one naphthalene derivative, said derivative comprising naphthalene and at least two alkyl groups where the alkyl groups are co-planar with said naphthalene;
      ii) at least one fluor; and
      iii) radioactive analyte comprising at least one beta emitter and at least one alpha emitter;
   (b) obtaining an emission spectrum of said beta emitter and said alpha emitter, wherein said emission spectrum provides information sufficient for quantitating said beta emitter and said alpha emitter.

2. The method of claim 1 wherein said alpha-beta discrimination sample solution further comprises at least one solvent.

3. The method of claim 1 wherein said alpha-beta discrimination sample solution further comprises at least one emulsifying agent.

4. The method of claim 1 wherein each alkyl group of said naphthalene derivative is individually selected from the group consisting of branched alkyls having from about 2 to about 3 carbon atoms, wherein the carbon atoms are attached to other carbon atoms of the branched alkyl by single bonds; branched alkyls having from about 2 to about 6 carbon atoms, where the carbon atoms of the branched alkyl are attached to each other by double bonds; straight chain alkyls having from about 1 to about 3 carbon atoms, where the carbon atoms of the straight chain are attached to each other by single bonds; and straight chain alkyls having from about 1 to about 6 carbon atoms, where the carbon atoms are attached to other carbon atoms of the straight chain by double bonds.

5. The method of claim 1 wherein said naphthalene derivative is a di-isopropyl naphthalene.

6. The method of claim 1 wherein said fluor is selected from the group consisting of 2-(4'-biphenylyl)-6-phenylbenzoxazole ("PBBO"); 2-(4-tert.-butylphenyl)-5-(4"-biphenylyl)-1,3,4-oxadiazole ("Butyl-PBD"); 2-(1-naphthyl)-5-phenyloxazole ("αNPO"); 2-(4-biphenylyl)-5-phenyl-1,3,4-oxadiazole ("PBD"); 9,10-diphenylanthracene ("DPA"); 2,5-diphenyloxazole ("PPO"); 2,5-bis (5'-tert.-butyl-2-benzoxazole) thiophene ("BBOT"); p-bis (o-methylstyryl) benzene ("BisMSB"); and 2,3'-p-phenylenebis [5-phenyloxazole] ("POPOP").

7. The method of claim 1 wherein said fluor is PBBO.

8. The method of claim 2 wherein said solvent is an aromatic compound.

9. The method of claim 2 wherein said solvent is selected from the group consisting of 1,2,4-trimethyl benzene, p-xylene, toluene, benzene, dioxane, and cyclohexane.

10. The method of claim 2 wherein said solvent is biodegradable.

11. The method of claim 2 wherein said solvent is selected from the group consisting of di-isopropyl naphthalene and phenylxylylethane.

12. The method of claim 2 wherein said solvent is phenylxylylethane.

13. The method of claim 3 wherein said emulsifying agent is selected from the group consisting of ethoxylated nonylphenol and sodium dihexyl sulfosuccinate.

14. The method of claim 1, wherein the H Number of said solution is less than about 175.

15. The method of claim 1 wherein the H Number of said solution is less than about 100.

16. The method of claim 1 wherein the H Number of said solution is less than about 25.

17. The method of claim 1 wherein said radioactive analyte is an alpha-emitting radionuclide.

18. The method of claim 1 wherein said radioactive analyte is a beta-emitting radionuclide.

* * * * *